(12) United States Patent
Mitra et al.

(10) Patent No.: US 7,754,054 B2
(45) Date of Patent: Jul. 13, 2010

(54) MICROWAVE INDUCED FUNCTIONALIZATION OF SINGLE WALL CARBON NANOTUBES AND COMPOSITES PREPARED THEREFROM

(75) Inventors: Somenath Mitra, Bridgewater, NY (US); Zafar Iqbal, Morristown, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 1124 days.

(21) Appl. No.: 11/374,499

(22) Filed: Mar. 13, 2006

(65) Prior Publication Data

US 2006/0210466 A1 Sep. 21, 2006

Related U.S. Application Data

(60) Provisional application No. 60/660,802, filed on Mar. 11, 2005, provisional application No. 60/767,564, filed on Jan. 10, 2006, provisional application No. 60/767,565, filed on Jan. 10, 2006.

(51) Int. Cl.
  *C07C 1/00* (2006.01)
  *A62D 3/00* (2007.01)
  *C01B 31/00* (2006.01)
  *C07F 1/00* (2006.01)

(52) U.S. Cl. ............ 204/157.15; 204/157.43; 204/157.47; 204/157.6

(58) Field of Classification Search ............ 204/157.15, 204/157.43, 157.47, 157.6
See application file for complete search history.

(56) References Cited

U.S. PATENT DOCUMENTS

2005/0186378 A1* 8/2005 Bhatt ..................... 428/36.9

OTHER PUBLICATIONS

Delgado et al., Microwave-Assisted Sidewall Functionalization of Single-Wall Carbon Nanotubes by Diels-Alder Cycloaddition, Chemical Communications (no month, 2004), No. 15, pp. 1734-1735.*

Delgado, et al., Microwave-Assisted Sidewall Functionalization of Single-Wall Carbon Nanotubes by Diels-Alder Cycloaddition, Chemical Comminications (no month, 2004), No. 15, pp. 1734-1735, expecially p. 1734.

Tasis, et al., Soluble Carbon Nanotubes, Chem. Eur. J. (no month, 2003), vol. 9, pp. 400-4008, especially pp. 4002-4005.

Holzinger et al., Sidewall Functionalization of Carbon Nanotubes, Angew. Chem. Int. Ed. (no month, 2001), vol. 40, No. 21, pp. 4002-4005, especially p. 4003.

(Continued)

*Primary Examiner*—Edna Wong
(74) *Attorney, Agent, or Firm*—McCarter & English, LLP

(57) ABSTRACT

The invention is directed to a method of forming, producing or manufacturing functionalized nanomaterials, and, specifically, soluble functionalized nanomaterials. The presently described invention also relates to nanomaterial-based composites consisting of a target material, which can include ceramic, polymer, or metallic matrices incorporated into or grown on nanomaterials, as well as a method or synthesis technique for the formation, production, or manufacture of nanomaterial-based composites through microwave-induced reaction.

14 Claims, 10 Drawing Sheets

(a)

(b)

OTHER PUBLICATIONS

Wang, X., et al., "Contact-damage-resistant ceramic/single-wall carbon nanotubes and ceramic/graphite composites"; Nature Materials; vol. 3 (Aug. 2004) pp. 539-544.

Guo, T. et al., "Catalytic growith of single-walled nanotubes by laser vaporization", Chemical Physics Letter 243 (1995); pp. 49-54.

Eklund, P.C., et al. "Large-Scale Production of Single-Walled Carbon Nanotubes Using Ultrafast Pulses from a Free Electron Laser", American Chemical Society 2002; pp. 561-566.

Nikolaev, P., et al. "Gas-phase catalytic growth of single-walled carbon nanotubes from carbon monoxide"; Chemical Physics Letters 313 (1999); pp. 91-97.

Journet, C. et al. "Large-scale production of single-walled carbon nonotubes by the electric-arc technique"; Nature vol. 388 (1997) pp. 756-758.

Wang, Y. et al. "The large-scale production of carbon nanotubes in a nano-agglomerate fluidized-bed reactor"; Chemical Physics Letters 364 (2002); pp. 568-572.

Kato, T. et al. "Structure control of carbon nanotubes using radio-frequency plasma enhanced chemical vapor deposition"; Thin Solid Films 457 (2004); pp. 2-6.

Lyu, S.C. et al., "Large-Scale Synthesis of High-Quality Single-Walled Carbon nanotubes by Catalytic Decomposition of Ethylene"; J. Phys. Chem B 2004, 108; pp. 1613-1616.

Kuzmany, H., et al. "Functionalization of carbon nanotubes"; Synthetic Metals 141 (2004); pp. 113-122.

Loupy, Andre "Solvent-free microwave organic synthesis as an efficient procedure for green chemistry"; C.R. Chimie 7 (2004); pp. 103-112.

Kamalakaran, R. et al., "Microstructural characertization of C-SiC-carbon nanotube composite flakes"; Carbon 42 (2004); pp. 1-4.

Lewis, D.A., et al., "Accelerated Imidization Reactions Using Microwave Radiation"; Journal of Polymer Science: Part A: Polymer Chemistry, vol. 10 (1992); pp. 1647-1653.

Gedye, R., et al., "The Use of Microwave Ovens for Rapid Organic Synthesis"; Tetrahedron Letters, vol. 27, No. 3 (1986); pp. 279-282.

Giguere, R. et al., "Application of Commercial Microwave Ovens to Organic Synthesis"; Tetrahedron Letters, vol. 27, No. 41 (1986); pp. 4945-4948.

* cited by examiner

MICROWAVE INDUCED FUNCTIONALIZATION OF SINGLE WALL CARBON NANOTUBES AND COMPOSITES PREPARED THEREFROM

CROSS REFERENCE TO RELATED APPLICATIONS

This application claims the benefit of U.S. Provisional Application No. 60/660,802 filed Mar. 11, 2005; U.S. Provisional Application No. 60/767,564 filed Jan. 10, 2006; and U.S. Provisional Application No. 60/767,565 filed Jan. 10, 2006, all of which are herein incorporated in their entirety.

FIELD OF THE INVENTION

The present invention relates to the field of nanomaterials, including single wall nanotubes (SWNTs), multiwall nanotubes, nanohorns, fullerenes, nano onions, and nanocomposites. More particularly, the present invention relates to a method of forming, producing or manufacturing functionalized nanomaterials, and, specifically, soluble nanomaterials. The presently described invention also relates to nanomaterial-based composites consisting of a target material, which can include ceramic, polymer, or metallic matrices incorporated into nanomaterials, as well as a method or synthesis technique for the formation, production, or manufacture of nanocarbon composites through microwave-induced reaction.

BACKGROUND OF THE INVENTION

Single Wall Nanotubes (SWNTs)

There has been an intense interest in carbon nanotubes (CNTs) since their discovery by Iijima in 1991, in large part because they possess unique structural and electronic properties. Single wall carbon nanotubes (SWNTs) are the fundamental form of carbon nanotubes with unique electronic properties that emerge due to their one dimensionality. An SWNT comprises a single hexagonal layer of carbon atoms (a graphene sheet) that has been rolled up to form a seamless cylinder. Three types of SWNTs with differing chirality are expected to open new frontiers with applications ranging from new materials, to electronics and molecular scale sensing. Several processes for large scale synthesis/manufacture of SWNTs are also being developed by various research groups around the globe. These include Laser ablation (PLV) reported by Smalley's and Eklund's group (Guo et al., *Chem Phys Lett.*, 243 (1995) 49; Eklund et al., *Nano Letters* (2002), 2(6), 561-566), arc discharge by Journet and coworkers (Journet et al., *Nature* (London) (1997), 388 (6644), 756-758) and chemical vapor deposition (CVD) method by several different groups (Nikolav et al., *Chem. Phys. Lett.*, 313 (1999) 91; Wang et al., *Chem. Phys. Lett.*, 364 (2002) 568-572; Kato et al., *Thin Solid Films*, 457 (2004) 2-6; Lyu et al., *J. Phys. Chem. B*, (2004), 108, 1613-1616). CVD methods include high pressure and catalytic CVD. SWNTs produced from different methods show slight variations in their electronic properties, and in size distribution (Kuzmany et al., *Synthetic Metals*, 141 (2004) 113-122). (All references cited in this paragraph are herein incorporated by reference in their entirety).

Functionalization of SWNTs has been of much interest to the scientific community because it enhances applicability. For example, insoluble SWNTs can be rendered soluble, which will lead to easy processibility, as working with a suspension is always a challenge. Functionalization may also lead to more efficient purification/separation techniques, such as, those based on chirality, or, the separation of metallic SWNTs from semi-conducting ones. More importantly, functionalization leads to the development of new classes of material with specificity for different physical and chemical properties.

SWNTs have no functional groups and are consequently quite inert. Limited reactivity arises due to the curvature induced stress from the non-planer $sp^2$ carbons and the misaligned n orbitals. While there is a wealth of literature on the derivatization of the SWNTs, the two most general approaches appear to be 1,3-dipolar cycloaddition, and oxidation of some of the atoms at the tube ends or on the tube wall, and then substitution of the functionality thus formed (—F, —OH, —COOH). At this point, a variety of synthetic organic reactions can be carried out. An example of the former approach is a reaction with azomethine. The latter approach, on the other hand, requires a more aggressive oxidation, such as, refluxing with $HNO_3$, ozonation, or reaction with solid KOH.

Much of the effort so far has involved the use of conventional techniques such as refluxing and sonication. For different functionalization purposes, carbon nanotubes are usually treated in different solvents by refluxing, or heating and stirring. Many of these reactions need to be carried out over a long period of time. For example, for generating carboxyl groups, carbon nanotubes are often refluxed in concentrated $HNO_3$ for tens of hours; thereafter, several days are required for refluxing (or heating) for further functionalization in processes such as acyl chlorination and amidation, diimide-activated amidation, or 1,3-dipolar cycloaddition.

Acid treatment has been the most commonly used functionalization approach. It leads to debundling of the nanotubes, and is the first step towards amidation, esterification and other applications. Conventional acid treatment is a long process, however, as it requires several hours to several days depending upon the requirements of the final product. Further, most of the reported methods also involve multiple steps, and only a limited solubility has been achieved (order of few milligrams per liter) (see for example, Loupy A. *Solvent-free microwave organic synthesis as an efficient procedure for green chemistry*, C. R. Chimie (2004) 7(2): 103-112; Lewis et al., *Accelerated imidization reactions using microwave Radiation*, J. Polym. Sci. A (1992) 30:1647-1653). The development of a fast, efficient and controllable technique for SWNT functionalization will dramatically speed-up their real world applications.

A key issue in functionalization of SWNTs has been the desire to increase their solubility in both water and organic solvents. One disadvantage of many nanomaterials is their limited solubility in common solvents. Solubility of nanomaterials, specifically carbon nanotubes, in water would allow chemical derivatization and manipulation of the nanotubes to be facilitated simply and less expensively. Due to the tremendous benefits that soluble nanomaterials would create, considerable efforts have therefore been made in the past to make carbon nanotubes soluble in water and in organic solvents, but to date have been met with only limited success. Moreover, the solubilities achieved are mostly due to water-soluble macromolecules attached to the nanotubes, rather than the development of a soluble nanomaterial.

Microwaves

Microwaves are electromagnetic radiation in the 0.3-300 GHz frequency range (corresponding to 0.1-100 cm wavelength). To avoid interference with communication networks, all microwave heaters (domestic or scientific) are designed to work at either 2.45 GHz or 0.9 GHz, of which, the former is more prevalent. According to Planck's law, the energy at this wavelength is 0.3 cal/mol, and is therefore insufficient for molecular excitation, thus most of the energy is used in substrate heat-up. The mechanism of microwave heating is different from that of conventional heating, where heat is transferred by conduction, convection or radiation. In microwave heating, electromagnetic energy is transformed into heat through ionic conduction and the friction due to rapid reorientation of the dipoles under microwave radiation. The larger the dipole moment of a molecule, the more vigorous is the oscillation in the microwave field, consequently more heating. This type of heating is fast, has no inertia, and is in-situ without heating the surroundings.

Chemistry under microwave radiation is known to be quite different, fast and efficient (Gedye et al., *Tetrahedron Lett.,* 27 (1986) 279; Giguere et al., *Tetrahedron Lett.,* 27 (1986) 4945; Loupy et al., *Chimie,* 7 (2004) 103-112). It also reduces the need for solvents, thus it is eco-friendly. It has been exploited in a variety of organics synthesis including hetero cyclic, organometallic, and combinatorial chemistry. Some of the reported advantages are rapid reactions under controlled temperature and pressure (especially in a closed system), higher purity products achieved due to short residence times at higher temperatures, and better yields at even very short residence times. Another important factor is that during dipolar polarization under microwave radiation, the activation parameters are modified. For example, it has been reported by Lewis that during imidization of polyamic acid, the activation energy reduced from 105 to 57 KJ/mol. (Lewis et al., *J. Polym. Sci.,* 30A (1992) 1647) (All referenced cited in this paragraph are herein incorporated by reference in their entirety)

Composites

The mechanical properties of single wall carbon nanotubes (SWNTs) such as their stiffness, elasticity and high Young's modulus, make them ideal candidates for structural reinforcements in the fabrication of high strength, light weight, and high performance composites. Considerable investigations have been conducted on the SWNT based composites by both theoretical and experimental means. These prior art approaches involve, among other things, dispersion, melt mixing, milling, covalent grafting or in-situ growing SWNTs in different polymer or ceramic matrix to achieve the certain composite. The results, however, conflict among studies wherein some studies revealed that the introduction of SWNTs in polymer clearly enhances both the physical and mechanical properties while others showed that the carbon nanotube contributed no mechanical improvement to the composites.

The ineffective utilization of nanotubes as reinforcement in composites is normally suffered from two factors, non-uniform dispersion of SWNTs in matrix and poor interfacial bonding between them. The latter one consequently will result in low efficiency of load transfer across the nanotube/matrix interface, and the pull-out of carbon nanotubes from the matrix can be observed when the composites are under extension.

The excellent mechanical, thermal and electrical properties of carbon nanotubes and SWNTs would be significantly enhanced by the development of nanocomposites containing ceramic, polymer and metal incorporated into carbon nanotubes. Desirable properties for ceramic, polymer and metal composites include mechanical toughness, wear resistance, and the reduction in crack growth coupled with improved thermal conductivity, resistance to thermal shock and increased electrical conductance. For example, the ceramics are inherently brittle and the incorporation of SWNTs is known to have improved toughness by as much as 24% (Kamalakaran et al., *Microstructural characterization of C-SiC-carbon nanotube composite flakes,* Carbon (2004) 42(1): 1-4).

Significant efforts have gone into theoretical and experimental investigations of carbon nanotube-based composites, but challenges in fabrication, particularly for ceramics and metals have not been overcome. Fabrication methods such as, hot pressing, sintering, milling, covalent grafting and in-situ catalytic growth in ceramic and polymer matrices via chemical vapor deposition (CVD), have been used. These methods may be classified as those where the carbon nanotubes and the ceramic were physically mixed and then bonded by heat-treatment, or those where the nanotubes were grown in a ceramic matrix via CVD. This typically generates a mixture of single and multiwall nanotubes along with amorphous carbon. As an example of the former approach, $Al_2O_3$/nanotube composites were prepared by ball milling a methanol suspension of the ceramic and nanotubes for 24 hours (Wang et al., *Contact-damage-resistant ceramic/single-wall carbon nanotubes and ceramic/graphic composites,* Nature Materials (2004) 3: 539-544). An example of the latter is the synthesis from a slurry of SiC and ferrocene in xylene, which was sprayed into a reactor at 1000° C. under argon (Kamalakaran et al.). The observed ineffective utilization of carbon nanotubes as the reinforcing material in many of these composites has been attributed to the non-uniform dispersion of carbon nanotubes, and the poor interfacial adhesion to the matrix. For example, the latter results in ineffective load transfer across the nanotube/matrix interface, and the "pullout" of carbon nanotubes has been observed when the composite is under strain. An important issue has been the high temperature and reactivity of some of the current methodologies, which can destroy and/or damage the carbon nanotubes.

In summary, functionalization of carbon nanotubes by known conventional methods is a tedious and time-consuming procedure. Consequently, there is a need to develop techniques for fast functionalization and solubilization of SWNTs, as well as composites thereof.

SUMMARY OF THE INVENTION

The present invention is directed to a method for rapidly functionalizing a nanomaterial, comprising performing a functionalization reaction wherein said functionalization reaction comprises subjecting said nanomaterial and at least one functionalizing reactant to microwave conditions.

The invention is further directed to a method for rapidly generating a soluble, functionalized nanomaterial comprising a functionalization reaction wherein said functionalization reaction comprises subjecting said non nanomaterial and at least one functionalizing reactant to microwave conditions.

The invention is also directed to a method for producing a nanomaterial composite comprising the step of growing a ceramic on a nanomaterial.

The invention is even further directed to a method for producing a nanomaterial composite comprising the step of growing or polymerizing target material precursors on the nanomaterial.

The invention additionally is directed to a method for synthesizing a nanomaterial composite comprising:
 providing a nanomaterial;
 adding a target material selected from the group consisting of a ceramic compound, a metal, a polymer, and combinations thereof, to said nanomaterial, wherein the target material and nanomaterial combination is exposed to microwave conditions to form said nanomaterial composite.

The invention is finally directed to a method for synthesizing a nanomaterial composite comprising of decomposing a metal salt or an organometallic compound on the nanomaterial.

BRIEF DESCRIPTION OF THE DRAWINGS

FIG. 11a depicts the whole composite at a scale bar of 1 cm. FIG. 11b is a magnified portion of the composite shown at a scale bar of 2 mm.

FIG. 13(a) depicts the purified and acid washed SWNTs. FIG. 13(b) depicts starting material of chlorotrimethyl silane. FIG. 13(c) depicts the SWNTs-SiC composite. The "*" in FIGS. 13(a) and 13(c) denotes the water impurity from KBr used as a supporting matrix for the samples.

FIG. 14(a) depicts the spectrum of pristine SWNTs, while FIG. 14(b) depicts the spectrum of the SiC-SWNT composite.

FIG. 15(a) depicts the SEM image of SWNTs covered by fine SiC particles at a scale bar of 200 nm. FIG. 15(b) depicts a SEM image showing an individual nanotube covered by SiC particles at a scale bar of 200 nm. FIG. 15(c) depicts a SEM image showing a portion of SWNTs fully covered by SiC spheres at a scale bar of 200 nm. FIG. 15 (d) depicts a SEM image showing embedded nanotubes from the fractured composite at a scale bar of 1 μm. FIG. 15(e) depicts a TEM image of debundled, SiC coated SWNTs, and randomly linked by SiC spheres at a scale bar of 50 nm. FIG. 15(f) depicts a magnified TEM image showing the SiC coated and linked nanotubes at a scale bar of 10 nm.

DETAILED DESCRIPTION OF THE INVENTION

Figure 1:
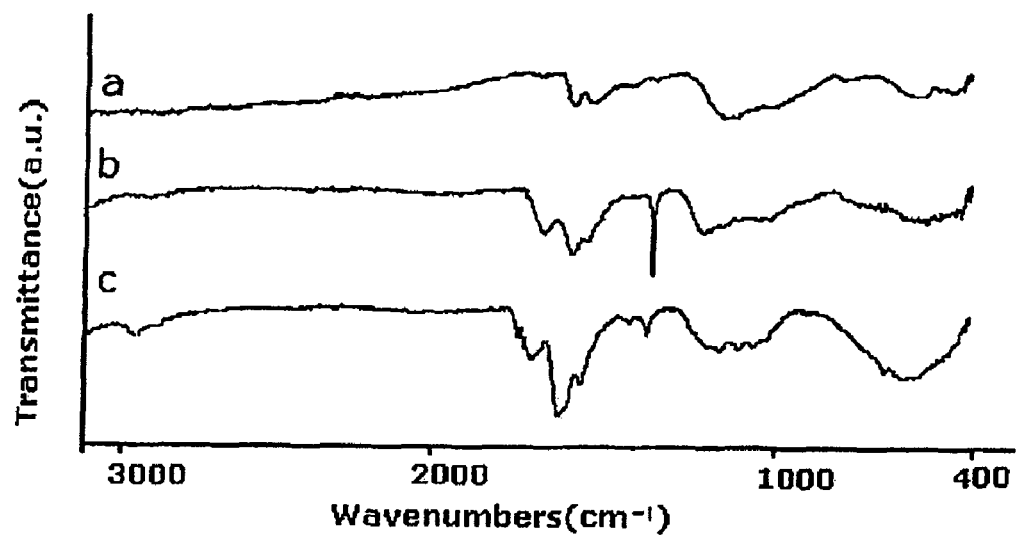
FIG. 1 compares the FTIR spectra of (a) pristine SWNTs, (b) $HNO_3$ treated SWNTs with microwave, and (c) 2,6-dinitroaniline functionalized SWNTs.

The present invention is a method of forming, producing or manufacturing rapidly functionalized and highly soluble nanomaterials, most specifically carbon nanotubes. Specifically, we present the first application of microwave-induced functionalization of Single wall nanotubes (SWNTs), which reduces the reaction time to the order of minutes.

For the purposes of this application "nanomaterials" can include single wall nanotubes (SWNTs), multiwall nanotubes, nanohorns, fullerenes, nano onions and nanocomposites. These nanomaterial also include but are not limited to carbon based nanomaterial such as carbon nanotubes and carbon SWNTs.

Functionalization of nanomaterials serves several important functions. Materials such as carbon nanotubes are inert and do not mix and blend easily in most matrices. They are not soluble either, so they can not be processed easily either in thin films or polymer composites. Functionalization allows the chemical structure of the nanotubes to be modified, and other functional groups, polymers, ceramics, biological molecules such as enzymes and other appropriate chemical moeties can be attached. For example treating with acid generates —COOH groups to which other functionalities can be attached by a variety of chemical reactions. Some functionalization reactions may be carboxylation, sulfonation, esterification, thiolation, carbine addition, nitration, nucleophylic cyclopropanation, bromination, fluorination, diels alder reaction, amidation, cycloaddition, polymerization, adsorption of polymers, addition of biological molecules and enzymes etc. The funtionalization may be covalent bonding to the nanotube, or noncovalent adsorption or wrapping. By putting appropriate functionality, the nanotubes may be rendered soluble in aqueous, organic, polar, nonpolar, hydrogen bonding, ionic liquids, and other solvents so that they can be processed easily. Polymer or ceramic precursor may also be reacted with nanotubes to form composites, or biological molecules may be attached for drug delivery, sensing or other important functions.

In general, the process of the invention begins with the combining of the desired nanomaterial, either prefunctionalized or non-functionalized, with the functionalizing reactant such as an acid, base, urea, alcohol, organic solvent, benzene, acetone and any other reactant that achieves the desired functionalization reaction. The combination is then subjected to appropriate microwave conditions that result in functionalization of the nanomaterial. In alternative embodiments, the functionalized nanomaterial can be subjected to further functionalization reactions using the same inventive process. For example, it may be necessary to functionalize a nanomaterial with carboxyl groups prior to functionalizing with desired functionalizing reactant.

The method of the invention incorporates the use of microwave induced functionalization of SWNTs. This high-energy procedure to reduce the reaction time to the order of minutes. The microwave provides in-situ, molecular heating in a microwave oven. The power and time can be adjusted for optimized performance and results. Specifically, the microwave power is adjustable anywhere from a few hundred watts to several kilowatts depending upon how quickly one desires the reaction to be completed. Such conditions will vary depending upon the desired functionalization reaction. Preferred reaction times for functionalization are anywhere from 1 second to 30 minutes. The amount of material to be processed can range anywhere from a few mg to several kg, . . . .

Two preferred embodiments include amidation of SWNTs and 1,3-dipolar cycloaddition of SWNTs. The amidation reaction is completed in two steps (as opposed to three in conventional approaches). Specifically, while the step involving acyl chlorination is bypassed, the yield remains the same. The 1,3-dipolar cycloaddtion of SWNTs embodiment can be carried out in, for example, 15 minutes under microwave conditions, and the results are similar to what was achieved in 5 days using conventional methods. In summary, microwave assisted reactions are a fast and effective method for reactions involving SWNTs.

The first preferred embodiment involves carboxylation (generation of —COOH) of SWNTs followed by amidation, as shown in the scheme 1 below.

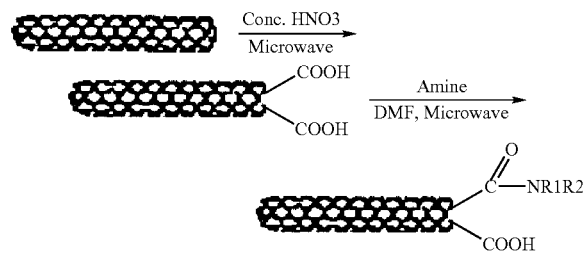

Scheme 1, amidation of SWNTs,

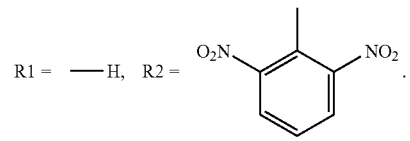

The second preferred embodiment is 1,3-dipolar cycloaddtion reaction of SWNTs, together with α-amino acid and aldehyde, and this is shown as scheme 2 below.

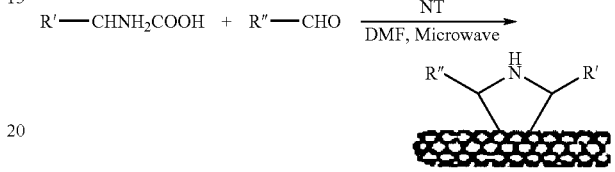

Scheme 2, 1, 3-dipolar cycloaddition of SWNTs,

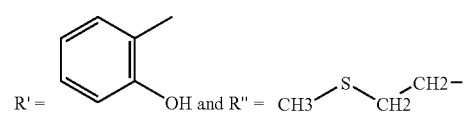

A distinct advantage of the present invention is rapid funtionalization. The speed of this reaction is partially due to rapid heating and even superheating at a molecular level. Side reactions are also eliminated as the bulk does not need to be heated. When practicing the disclosed method of synthesis, the microwave induced reaction occurs in a matter of seconds or minutes and can generate a high purity product with high yield. This is advantageous because it makes the overall process cost effective.

Further, the microwave induced reactions as a means of nanotube functionalization is also extremely important from the stand point of process development and scale-up. The ease of creating functionalized soluble nanomaterials increases production of nanomaterials at a reduced price thereby enabling sufficient quantities to be produced for use in commercial goods as well as production at a cost that can be tolerated by consumer markets. Additionally the method in generally reduces reaction time by orders of magnitude and provides high yield adding to its cost effectiveness.

Also presented in this document is a novel, simple and fast approach to synthesize highly water soluble nanomaterials under microwave radiation. Carbon nanotubes, for example, have inert, graphitic sidewalls and are therefore extremely insoluble in common solvents. In order to make carbon nanotubes soluble in water and related organic solvents commonly used in chemical and biological applications, a new method to produce highly effective and rapid sidewall functionalization was required and is presently disclosed.

One embodiment of the present invention is a method for generating soluble nanomaterials by the use of microwaves and an acidic environment. The acidic environment can be a suspension of nanotubes in an acid or acid mixture. In one embodiment, a blend of acids, in a variety of proportions can be used to create the acidic environment. By way of example only and without limitation, some examples of acids that could be utilized to create the acidic environment include, nitric acid, sulfuric acid, hydrochloric acid, as well as other organic and inorganic acids. In one embodiment, a pairing of nitric acid and sulfuric acid can be used to create the acid treatment. In another embodiment a 1:1 mixture of concentrated nitric acid and sulfuric acid in water was used.

This embodiment is an environmentally friendly, microwave-induced method to prepare highly water-soluble single-walled nanotubes (SWNTs) in about three minutes, using a closed vessel reactor. This embodiment has generated measured solubilities of more than 10 mg of nanotubes per milliliter of water and ethanol, which is several orders of magnitude higher than what has previously been achieved in the art. Additionally the solutions were free of suspended nanotubes as determined by light scattering measurements, and for the first time Raman spectrum of SWNTs was obtained from its solution phase.

Figure 7:
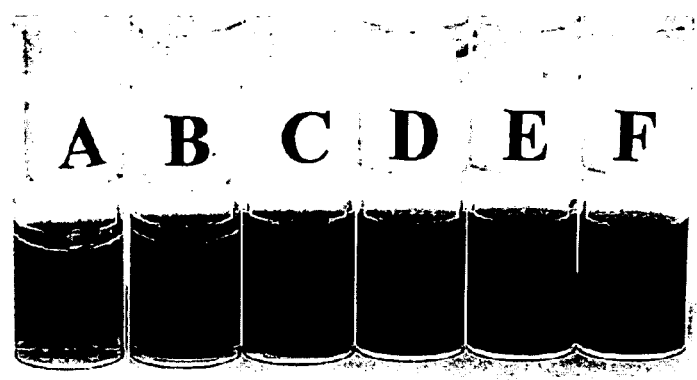
FIG. 7 consists of a series of photographs of SWNTs solution in distilled water as follows: (a) 0.05 mg/ml, (b) 0.1 mg/ml, (c) 0.2 mg/ml, (d) 0.3 mg/ml, (e) 0.5 mg/ml and (f) 2 mg/ml.

In one illustrative embodiment of the method currently described, highly pure single wall carbon nanotubes (SWNTs), were suspended in a 1:1 mixture of concentrated nitric acid and sulfuric acid in water and reacted in a closed vessel microwave oven for less than five minutes. Functionalized SWNTs obtained after three minutes of microwave treatment were found to have solubilities of more than 10 mg of SWNTs per milliliter of de-ionized water and ethanol under ambient conditions, and significantly higher solubilities were obtained in acidic water. Photographs of aqueous solutions of different concentrations of functionalized SWNTs produced by this method are shown in FIG. 7. The presently disclosed method, as seen through this particular embodiment, is a relatively simple microwave technique that produces highly water-soluble nanotubes that enable the processing of nanotubes in bulk quantities and hasten real-world applications of this unique material.

In the current invention, the placing of a nanomaterial in an acidic environment maybe called an acid treatment. In one embodiment, when the nanotubes contact the acid treatment, the nanotubes became nitrated.

The presently described method offers the significant advantages of generating high solubility functionalized nanomaterials that are rapidly functionalized at low temperatures with preferred alignment in solution and electrically conductive properties. Additionally, the method itself is environmentally friendly and scalable for industry thereby enabling the production of economical bulk quantities of highly reproducible product to consumers.

Specifically, the method of the present disclosure offers significant advantages relative to prior art. The advantageous properties and/or characteristics of the disclosed method include, but are not limited to, high solubility functionalized nanomaterials, preferred alignment of the nanomaterials in solution, rapidly functionalized nanomaterials, electrically conducting nanomaterials, environmentally friendly, scalable for industry to produce bulk quantities and economically bring the product to consumers, it generates highly reproducible products and can operate at low temperatures.

The resultant high water and alcohol solubility of the method of the invention will enable nanomaterials and SWNTs to be more easily processed in operations involving chemical reactions, physical blending, or thin film formation. Further, the nanomaterials and SWNT will have a more preferable alignment during deposition from solution due to the presently disclosed method. The enhanced alignment will facilitate the creation of novel nanoelectronic device architectures.

The resulting soluble nanomaterials of the invention can also be electrically conducting. The SWNT can display significantly higher conductivity in de-ionized water, for example, in this case as high as 215.8 µS (one or two orders of magnitude higher is also possible) relative to that of 1.5 µS for de-ionized water. This advantage raises the possibility for electrical manipulation (such as, electrodeposition) of the SWNTs from a solution phase.

The presently disclosed method of synthesis is also highly reproducible as evidenced by the creation of a solid composite of similar morphology, shape, and color with every reaction (see Example 3). The high level of reproducibility is partially due to the controlled environment. This is advantageous because high purity products can be obtained.

The presently disclosed method of synthesis is appealing because it requires a relatively low temperature microwave-induced reaction to produce soluble nanomaterials. The presently disclosed method of synthesis has the ability to operate at a low temperature due in part to in-situ heating at the reaction site. This is advantageous because it leads to fast reaction kinetics and reactions that would not otherwise be possible.

Composites Of The Invention

The present invention is also directed to a composite consisting of target material(s) such as ceramic, polymer or metals to be incorporated into or grown on nanomaterials such as carbon nanotubes or SWNTs. Specifically, the present invention provides a technique for the formation, production, or manufacture of nanomaterial composites through a controllable, rapid, relatively low temperature microwave-induced reaction. In one embodiment, the process of the invention comprises the combination of a target material precursor with the desired nanomaterial under microwave conditions such that the target material forms on the nanomaterial (e.g. polymerization).

In the process of the invention, appropriate quantities of the target material and the nanomaterial are blended or mixed together under known conditions and are then subjected to appropriate microwave conditions to form the desired composite. In an alternative embodiment, a precursor to the target material is combined with the nanomaterial under known conditions, and said combination is subjected to appropriate microwave conditions that induce formation of the target material from the precursor which then combines with the nanomaterial to form the desired composite. More specifically, a reaction can be carried out to deposit ceramic or polymer material on the nanotube. The other approach is that polymer or ceramic precursors can be polymerized or synthesized directly on the nanotube sidewalls.

Often times it may be necessary to functionalize the nanomaterial prior to forming the composite. It is contemplated herein that the functionalization of the nanomaterial be accomplished using the method of this invention prior to subjecting the nanomaterial to the composite formation set forth in the invention.

Some examples of ceramic compounds that are suitable for use in the invention include, but are not limited to, carbides, borides, nitrides, silicides, barium titanate, bismuth strontium calcium copper oxide, boron carbide, boron nitride, aluminum silicates, earthenware, Ferrite, lead zirconate titanate, magnesium diboride, porcelain, silicon carbide, silicon nitride, Steatite, uranium oxide, yttrium barium copper oxide, zinc oxide, zirconia, and combinations thereof.

In a preferred embodiment, some examples of metals suitable for use in the invention include salt such as $LiAlH_4$. $LiBH_4$; and CdS.

Some examples of preferred polymers, and precursors thereof, include, but are not limited to methyl methacrylate, polyvinyl pyrrolidone, polyurethane, polyamide and any other related polymers.

In particular, the process of the invention is excellent for creating novel nanoscale silicon carbide (SiC)-carbon nanotube composites and metal-nanotube composites. More particularly, the present invention relates to a method enabling the formation of a ceramic or polymer directly on the carbon nanotubes, rather than physical mixing, or the growth of nanotubes in a ceramic or polymer matrix. The described technique creates mechanical toughness, wear resistance, and the reduction in crack growth coupled with improved thermal conductivity, resistance to thermal shock and increased electrical conductance.

In particular, the process is excellent for using a variety of silanol compounds, including silicon carbide (SiC), to create novel nanoscale composites such as silicon carbide (SiC)-carbon nanotubes, and, more generally, metal-nanotube composites. Silicon carbide (SiC) is an interesting material because it can be used for high-temperature and high-power electronic applications due to its excellent properties, such as high mechanical strength, high thermal stability, high thermal conductivity and large band gap. In addition, nanometer size SiC nanostructure might hold novel chemical and physical properties for fabricating electronic nanodevices.

Figure 11:
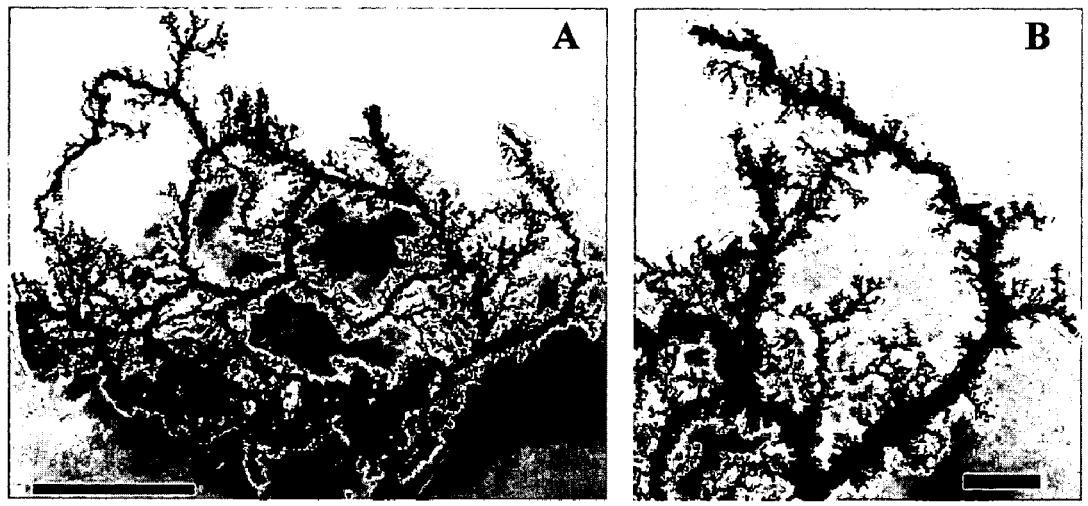
FIG. 11 comprises optical images of the SWNTs and SiC composite rapidly precipitating out of the fine suspension.
Figure 12:
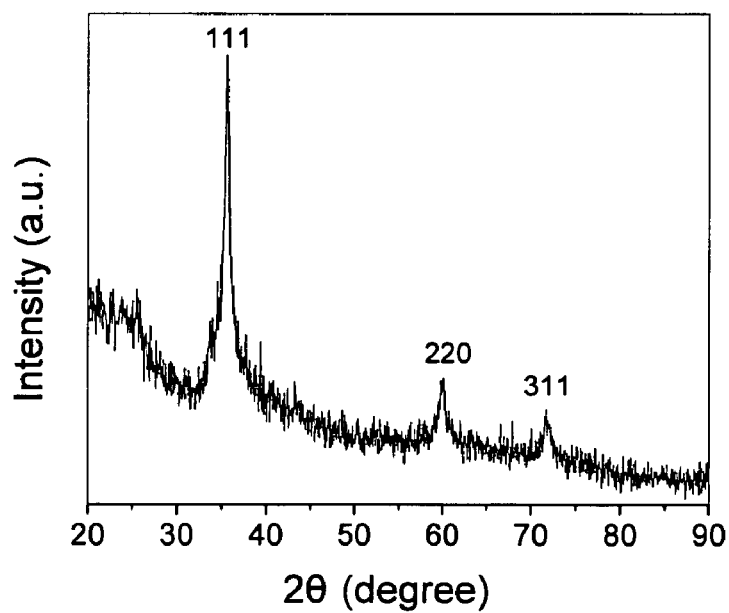
FIG. 12 shows an X-ray diffraction (XRD) pattern of the face-centered cubic structure of the SiC component in the SiC-SWNT composite.

A preferred embodiment includes a novel, low temperature, microwave-induced approach for the synthesis of a high purity SiC-SWNT composite. The reaction of the invention can be completed in a matter of minutes, and involves the nucleation of SiC directly on the SWNT bundles. In the prior art, formation of multiwalled tubes and other carbonaceous structures is usually performed in the reverse of what occurs in the present invention, i.e. growth of SWNTs in a ceramic matrix does not occur in the process of the invention because the process begins with the use of highly purified SWNTs. Specifically, the reaction involves the pyrolysis of the chlorotrimethylsilane and simultaneous nucleation of nanoscale SiC spheres onto carbon nanotubes. This reaction was carried out in microwave, and the whole process involves one step and about 10 min. In our testing, we randomly crossed linked the obtained composite into a root like structure (Shown in FIG. 11). The SiC-SWNT composite was analyzed and confirmed by X-ray diffraction (XRD), transmission electron microscope (TEM), scanning electron microscope (SEM), energy dispersion X-ray (EDX), Raman and fourier transform infrared (FTIR) spectra (see Example 3).

Regarding the above SiC-nanocarbon composite, we found strong interfacial bonding was indicated between nanometer size SiC spheres and SWNTs. This new material may thus open the door for fabricating nanoscale electronic devices.

An alternative embodiment of the invention relates to the synthesis of a ceramic carbon nanotube composite which incorporates ceramic matrices into carbon nanotubes. One specific embodiment of the invention is a ceramic SWNT composite, which incorporates ceramic matrices into SWNTs. Examples of these embodiments are illustrated in FIGS. 12-15. The present invention includes but is not limited to nanotubes, nanohorns, graphite and all similar or related structures.

In the method of synthesis of a ceramic SWNT, a preferred embodiment involves utilizing a microwave oven and a reaction chamber, lined with Teflon PFA® and fitted with a pressure controller. The SWNTs are first treated with a solution having acidic properties, such as nitric acid, sulfuric acid, and any other suitable organic and inorganic acid, for a short period of time under microwave conditions to reduce or eliminate residual metal catalyst and generate carboxyl groups. A silinol or a polymer precursor compound (e.g., methyl methacrylate), which contains the desired base material necessary to create the compound, is utilized. Then pretreated SWNTs and the precursor compound are added to the microwave reaction vessel and subjected to microwave induced reaction while controlling time, power (wattage) and pressure. The silanol precursor decomposes and the polymer precursor polymerizes to form said compound. The liquid in the control vessel is cooled and is then removed from the reaction chamber, washed and then dried.

More specifically, in this embodiment, the method of synthesis of the ceramic SWNTs presently described preferably involves the utilization of a microwave oven and a Teflon PFA® lined reaction chamber fitted with a pressure controller. The SWNTs are treated in the microwave with a nitric acid solution. The pretreated SWNTs are then added, along with chlorotrimethylsilane to the microwave reaction vessel and subjected to microwave induced reaction while controlling time, power (wattage) and pressure, thereby synthesizing the ceramic SWNT composites presently disclosed (see Example 3 for more detail).

In another embodiment of the method of synthesis of the ceramic, polymer, metallic or carbon nanotubes, the composite has been grown on the nanotubes by decomposing a chemical. In one embodiment, the reaction involves the microwave-induced decomposition of chlorotrimethylsilane in the presence of carbon nanotubes. Chlorotrimethylsilane provides an easy to decompose source of silicon for in-situ forming of the SiC component of the composite.

More specifically, the reaction involves the microwave-induced decomposition of a precursor chemical in the presence of carbon nanotubes, such that the new formed nanocarbon composite is formed directly around the tube. Accordingly, interfacial bonding is improved by in-situ growth of the ceramic or polymer or metal on the carbon nanotubes as opposed to the methods described in the prior art whereby the interfacial bonding occurs by adding the carbon nanotubes onto a pre-prepared ceramic or polymer. The presently disclosed composite formed in accordance with the disclosed method of a controllable rapid, relatively low temperature microwave-induced interfacial bonding significantly increases the mechanical toughness, wear resistance, thermal conductivity, resistance to thermal shock, and electrical conductance while reducing crack growth.

In another embodiment, the nanotube-metal composites can be fabricated by reactive processes. Reaction with a metal salt or a complex can be carried out. By way of example only and without limitation, an example is the reaction with lithium aluminum hydride (LiAlH4). The solid phase reaction of the nanotubes and LiAlH4 was carried out in an oven at temperature 250° C. or for a few minutes in a microwave. The LiAlH4 powder decomposed according to:

$$\text{LiAlH4} \leftrightarrow \text{LiH} + \text{Al} + 3/2\text{H2} \tag{1}$$

Figure 17:
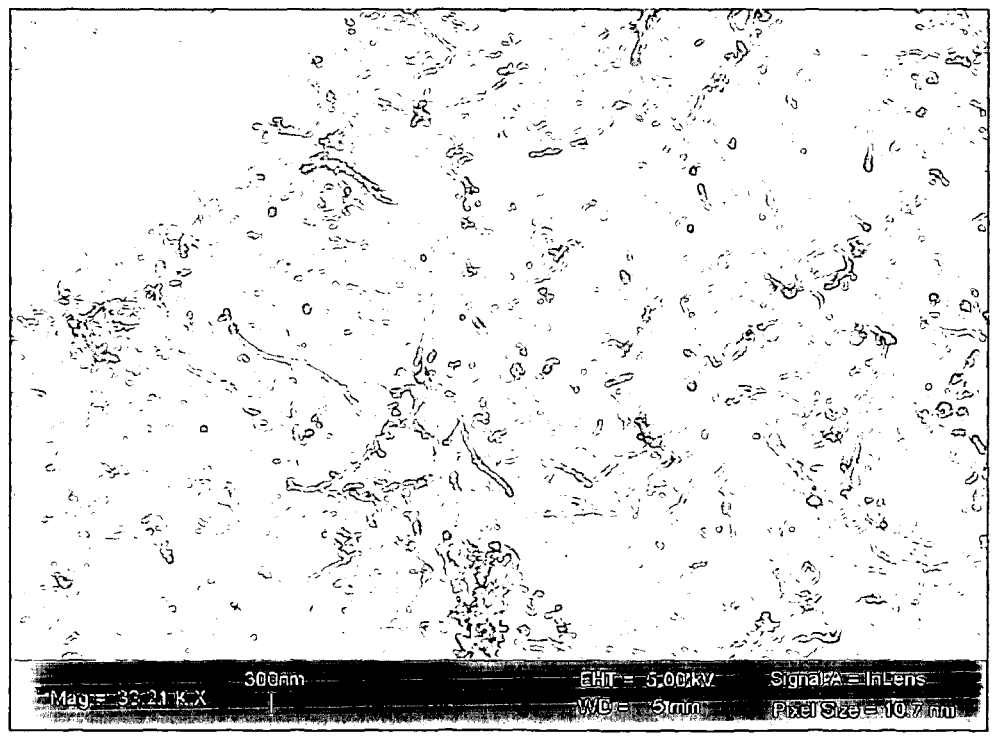
FIG. 17 depicts carbon nanotubes coated by solid phase $LiAlH_4$ decomposition.
Figure 18:
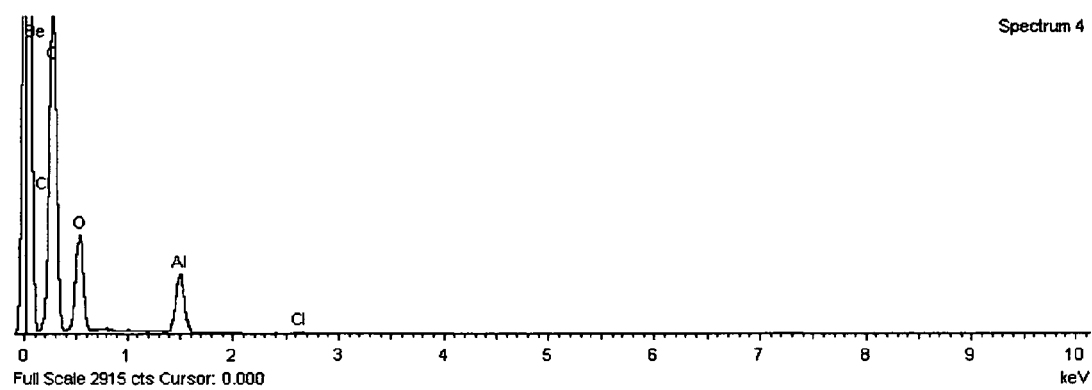
FIG. 18 depicts the energy dispersive x-ray (EDX) spectra of carbon nanotubes coated with $LiAlH_4$ decomposition.

Some of the Al is then deposited on the nanotube surface. The SEM image of Al coated nanotubes obtained by LiAlH4 decomposition is shown in FIG. 17, which shows the thickness of deposited Al. The typical EDX spectra of nanotubes coated with Al by LiAlH4 decomposition is shown in FIG. 18.

In alternate embodiments, the ceramic element can be substituted for by a polymer thereby creating a polymer nanomaterial composite or a metal thereby creating a metal nanomaterial composite.

The composites of the present invention offer significant advantages relative to prior art. The advantageous properties and/or characteristics of the disclosed composite include, but are not limited to, mechanical toughness, wear resistance, reduction in crack growth, improved thermal conductivity and resistance to thermal shock, and electrical conductance.

Regarding mechanical toughness, ceramics, for example are inherently brittle and the incorporation of nanotubes is reported to have improved toughness by as much as 24%. An increase in the mechanical toughness is a direct result of the improvement of the interfacial bonding caused by the in-situ growth of the ceramic or polymer on the carbon nanotubes as opposed to the prior art whereby the carbon nanotubes is merely added onto the pre-prepared ceramic. One benefit of mechanical toughness is that it allows the carbon nanotubes to be used under more strenuous conditions.

Wear resistance is much like mechanical toughness and is attributable to the improved interfacial bonding caused by the in-situ growth of the ceramic on the carbon nanotubes rather than merely by adding the carbon nanotubes onto the pre-prepared ceramic, thereby extending the life of the carbon nanotubes in a variety of applications.

The method of synthesis of the invention further facilitates a reduction in crack growth which can be attributed to the high binding capabilities of the carbon nanotubes.

The method of synthesis of the composite of the present invention offers significant advantages relative to prior art. The advantageous properties and/or characteristics of the disclosed method of synthesis of the composite includes, but are not limited to, rapid, low temperature microwave-induced reaction to create a novel nanoscale silicon carbide (SiC)-SWNT composite without side reactions. The method is highly reproducible by creating a solid composite of similar morphology, shape, color was obtained every time, cost effective and environmentally safe. Additionally, the speed of the reaction can be controlled. Finally, the in-situ heating facilitates reactions that are otherwise not possible.

The speed of the reaction is partially due to rapid heating and even superheating at a molecular level. Side reactions are also eliminated as the bulk does not need to be heated. When practicing the disclosed method of synthesis the microwave induced reaction occurs in a matter of seconds or minutes and can generate a high purity product with high yield. This is advantageous because it makes the overall process cost effective.

Because the method uses a relatively low temperature microwave-induced reaction to create the novel composites, it is advantageous because it leads to fast reaction kinetics and reactions that would not otherwise be possible. Also, the high level of reproducibility offered by the invention is advantageous because high purity products can be obtained. Of course, the presently disclosed method of synthesis is cost effective as it reduces reaction time by orders of magnitude and provides high yield. Finally, the invention has great appeal due to it being environmentally safe (minimal requirement of energy and chemicals).

Applicant has attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description

EXAMPLES

Example 1

Experiments were carried out in a CEM model_205 microwave oven. The reaction chamber was of 100 ml volume, lined with Teflon PFA®, and tilted with a 0~200 PSI pressure controller.

For the amidation reaction, the first step was the generation of carboxylic acid groups on the SWNTS. In a typical application, 6~10 mg of pristine SWNTs from Hipco process was loaded into an extraction vessel, along with 20 ml of conc. $HNO_3$ (70%). The microwave power setting was 75% (total of 900 watts), the pressure was set at 125 PSI, and the reaction was carried out for 10~15 min. After cooling the vessel to room temperature, the reacted mixture was filtered, washed and dried. About 5 mg of this carboxylic acid grafted SWNTs was used to react with 2,6-dinitroaniline. On amidation reaction, 20 ml of DMF was used as the solvent, 15 to 20 mg of amine was added, and all other conditions remained same as before. The reaction was carried out for 15 to 20 min. Once cooled, the mixture was filtered, washed with DMF and anhydrous THF. After vacuum drying at room temperature for few hours, the sample was analyzed by FTIR and Raman spectroscopy.

For the 1,3-dipolar cycloaddition reaction, about 10 mg of pristine SWNTs and 70 mg of salicylaldehyde were suspended in 20 ml DMF. Then, the mixture was heated in the microwave for 5 min at 90% microwave power, and at pressure setting of 160 PSI. After cooling, 2 ml of methionine suspension (70 mg in 4 ml) was added to the reaction vessel. Then reaction was carried out for 5 min at the same power and pressure setting. Again the vessel was allowed to cool, and the other half of the methionine suspension was added, and the reaction was carried out for another 5 min under the same conditions. Then, the reacted mixture was filtered, and the organic phase was vacuum evaporated. The resulting dark brown oil was extracted with $CHCl_3/H_2O$. Also, the organic phase was washed with water for 5 times, and then dried with $Na_2SO_4$ over night. Then, it was evaporated, washed with ethyl ether, and around 7 mg of dark brown solid was obtained after evaporation. The solid was evaluated using FTIR, H-NMR, SEM, and UV spectroscopy.

The conventional approach to amidation for SWNTs involves carboxylation, acyl chlorination, and amidation. It involves three steps and typical reaction time is of 3 to 5 days. The amidation of SWNTS in a microwave was a two steps process, and it's total reaction time is about 20 to 30 min. SWNTs functionalized through amidation in microwave were characterized using FTIR and Raman spectroscopy. The results are presented in FIGS. 1 and 2 respectively.

Figure 2:
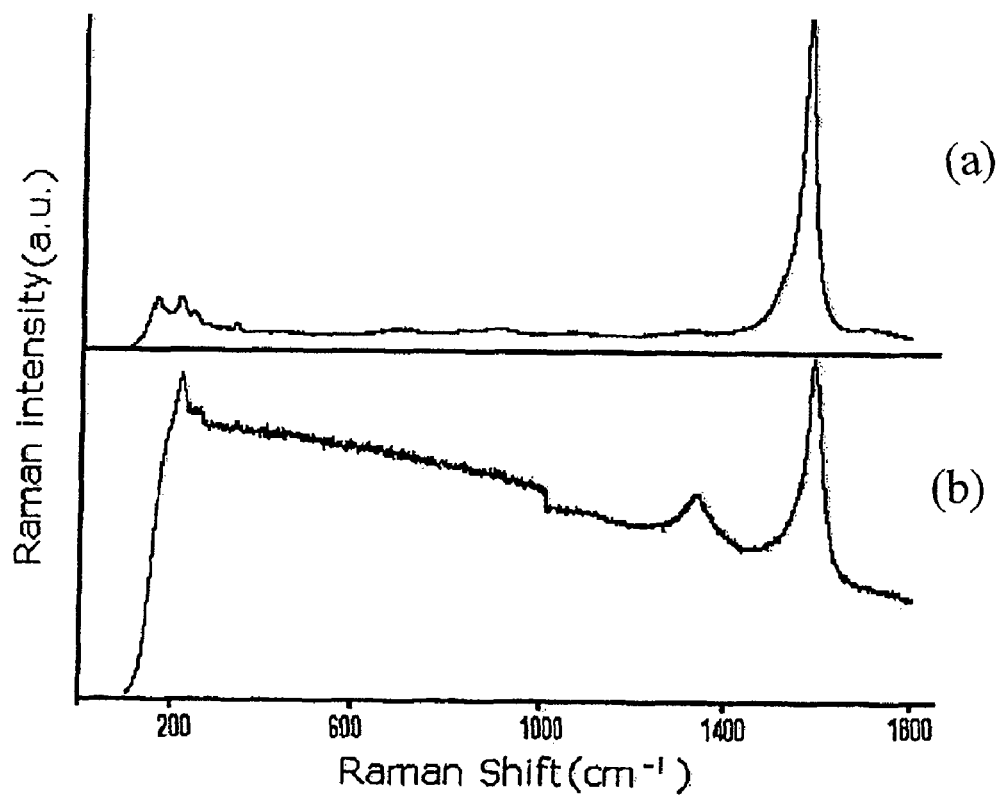
FIG. 2 compares the Raman spectra of (a) pristine SWNTs and (b) 2,6-dinitroanaline functionalized SWNTs.

FIG. 1 shows the FTIR spectra of pristine SWNT (a), $HNO_3$ treated SWNT (b), and finally after 2,6-dinitroaniline functionalized SWNT (c). In FIG. 1a, the peak at 1580 $cm^{-1}$ was assigned to C=C close to defect site of nanotubes. The band at 1626 $cm^{-1}$ is water impurity from KBr used for making the pellet, and this peak existed in FIGS. 1b and 1c as well. The C=O band at 1730 $cm^{-1}$ in the HNO3 treated SWNT indicated successful generation of COOH on the nanotubes (FIG. 1b). The sharp peak at 1384 $cm^{-1}$ is probably due to the nitration of $NO_2$ in SWNTS, which occurred during the high pressure $HNO_3$ treatment in microwave. After the reaction with 2,6-dinitroaniline, the amide linkage formed at the C=O as shown by the absorption band at 1650 cm$^{-1}$ in FIG. 1c. The remaining band at 1730 cm$^{-1}$ indicated incomplete reaction due to the steric effect of rigid ring from the attached amine.

The Raman measurements were carried out using a Horiba/Jobin Yvon LabRaman system place with 632.8 nm excitation. The Raman spectroscopy was carried out on both pristine and functionalized SWNTs. The Raman spectrum of functionalized SWNTs (FIG. 2b) shows significant fluorescence, due to the coverage of the amine on wall or the ends of SWNTs. Similar observation was also reported by several different groups (Huang et al., *Nano. Lett.*, (2002) 2, 311; Lin et al., *J. Phys Chem*. B (2002), 106, 1294-1298; Ya-Ping et al., *Acc. Chem. Res.* (2002), 35, 1096-1104). The enhanced peak at about 1330 cm-1 was attributed to covalent modification, as it revealed sp$_3$-hybridization of disorder within the nanotube framework.

Figure 3:
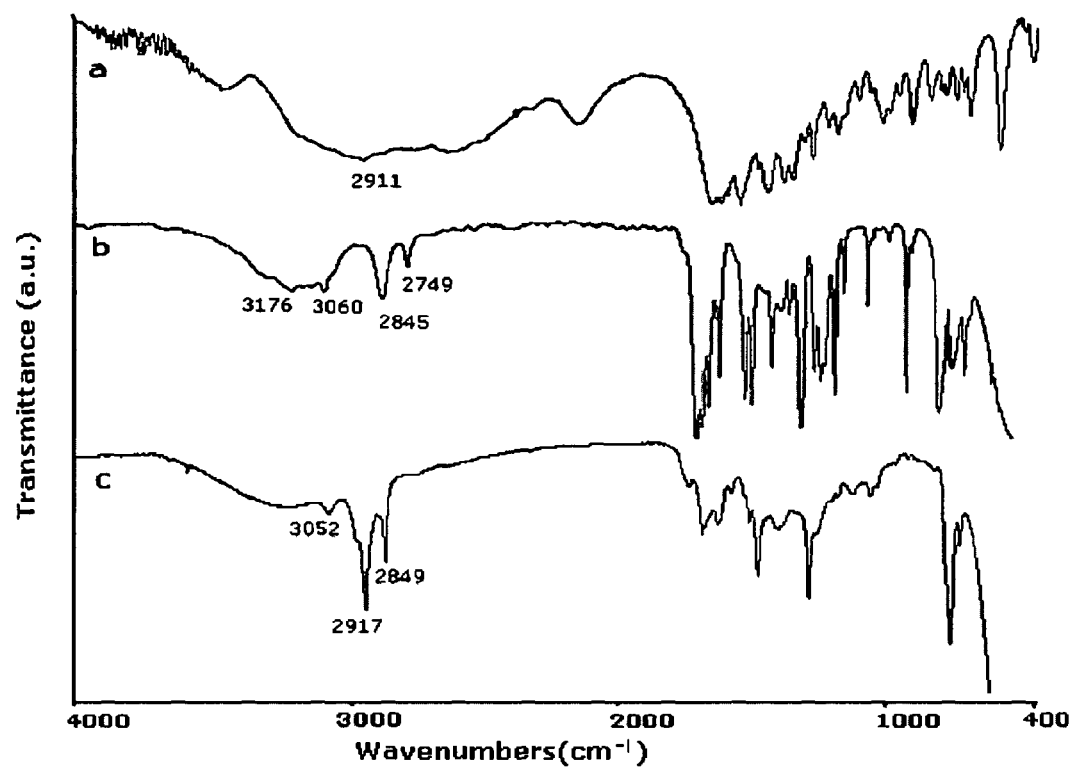
FIG. 3 compares the FTIR spectra of (a) L-methionene, (b) salicylaldehyde, and (c) final product of 1,3-dipolar cycloaddition of SWNTs.

Microwave Induced 1,3-Dipolar Cycloaddition of SWNT 1,3-dipolar cycloaddition of SWNT is a tedious and time consuming process when carried out by conventional methods, and may take as long as five days to complete the process. As mentioned above, the microwave induced reaction time was 20 to 30 min. The final product of 1,3-dipolar cycloaddtion functionalized SWNTs was highly soluble in CHCl$_3$ and CH$_2$Cl$_2$. It's FTIR spectrum, along with L-methionine and salicylaldehyde, is shown in FIG. 3.

The functionalized SWNTs (FIG. 3c) shows the absence of the aldehyde C—H stretching peaks at 2749 cm$^{-1}$ and 2845 cm$^{-1}$, which were present in the original aldehyde (FIG. 3b). As shown in the detailed description of this application, the aldehyde group was expected to be gone after functionalization. Therefore the missing of the aldehyde C—H peaks in FIG. 3c implies successful reaction of the functionalization. The aromatic C—H stretching band in FIG. 3c at 3052 cm$^{-1}$ was slightly shifted, as compare to spectra 3b of the aldehyde, which was at 3060 cm$^{-1}$. Moreover, the peaks at 2917 cm$^{-1}$ and 2849 cm$^{-1}$ were from the attached amino acid. These peaks were absent in the FTIR spectra of pristine SWNTs presented in FIG. 1a. This clearly demonstrated the functionalization of SWNTs. Some strong peaks from the aldehyde and the amino acid remained and were reasonably shifted in the low wavenumber range of the spectra.

Figure 4:
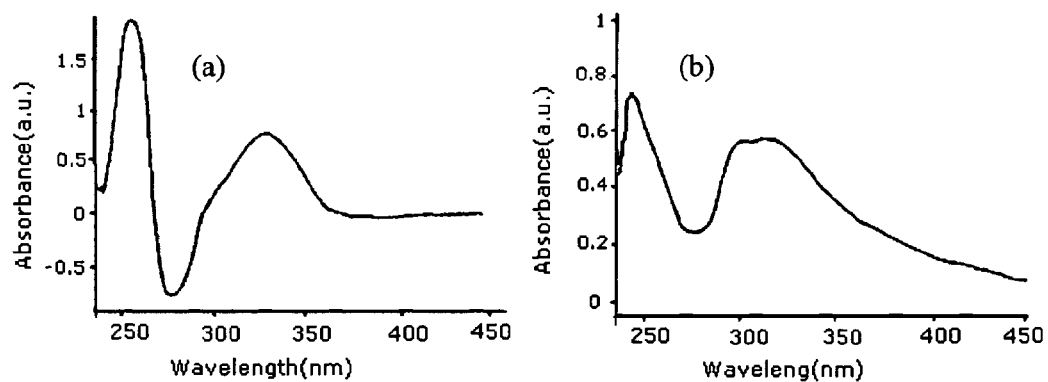
FIG. 4(a) shows the UV-vis absorption spectroscopy of the mixture of starting material.
FIG. 4(b) shows the UV-vis absorption spectroscopy of the final product of 1,3-dipolar cycloaddition of SWNTs

UV-vis absorption analysis presented in FIG. 4 provided further evidence of the functionalization reaction. The UV-vis absorption measurements were made in CHCl$_3$. Spectra (a) is from the mixture of the starting material taken in the same ratio as the reaction. It showed two broad absorption bands at about 250 and 330 nm. After the reaction, two bands remained, but shifted to the left, which was in agreement with the observation of Prato et al (Prato et al., *J. Am. Chem. Soc.* (2002) 124, 760-761). The shift of absorption bands provided further proof of a change in molecular structure brought by reaction.

Figure 5:
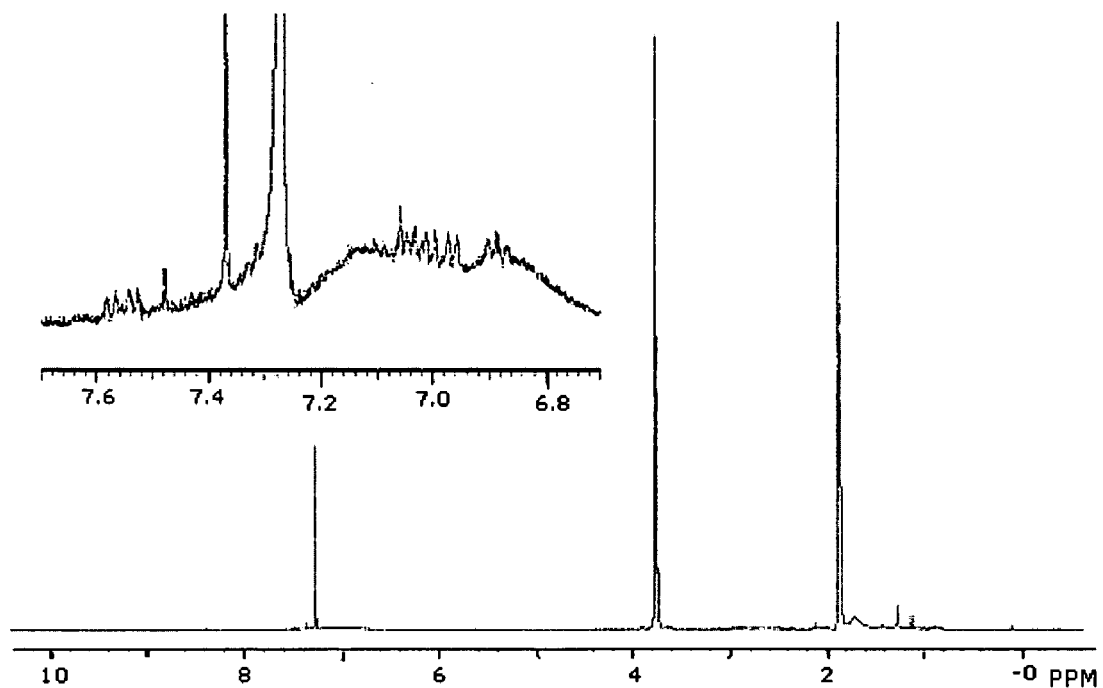
FIG. 5 presents the H NMR of the final product of 1,3-dipolar cycloaddition of SWNTs FIG. 6 sets forth SEM images of (a) pristine SWNTs; (b) same pristine SWNTs at higher magnification; (c) SWNTs after 1,3-dipolar cycloaddition functionalizaton; and (d) same SWNTs after 1,3-dipolar cycloaddition functionalizaton at higher magnification.

The H NMR measurements were made with the 1,3-dipolar cycloaddtion product, and the results are shown in FIG. 5. These were carried out in CDCl3, and the solvent peak was shown at 7.27 ppm. The aromatic H form salicylaldehyde still existed and are shown in the magnified window of up-left corner, but the aldehyde H (CHO) disappeared from the chemical shift at about 10 PPM. This is consistent with the FTIR measurements, and indicated that the reaction occurred. H from CH$_3$—S—CH$_2$— from the amino acid remained after the reaction, which is shown as the sharp peak at about 3.8 ppm. After reaction, and due to the lose of COOH group, the peak of H close to original COOH group is slightly shifted to 1.9 ppm from 2.1 ppm (the H NMR of the starting material is not shown in the spectra). The shift was expected due to the different magnetic environment after the reaction.

Figure 6:
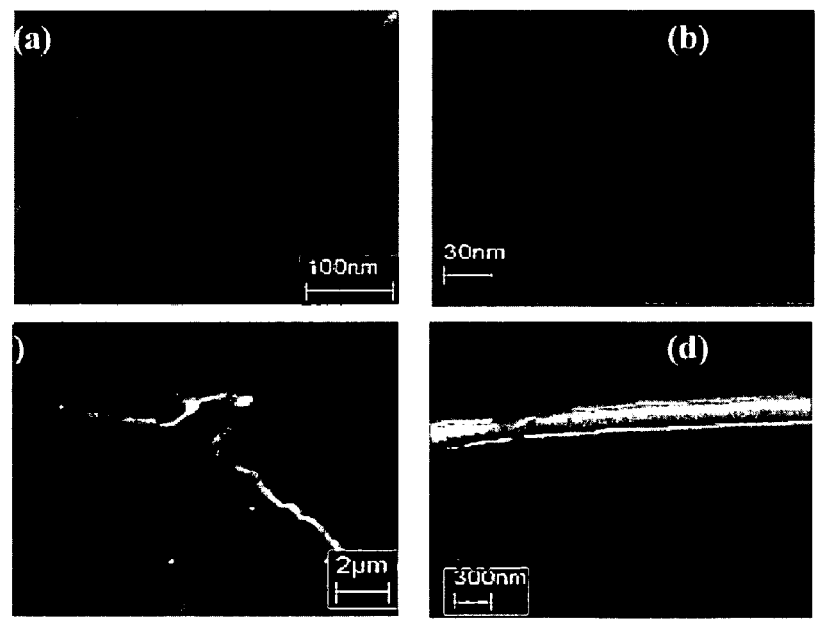

SEM image of purified SWNTs and 1,3-dipolar cycloaddition functionalized SWNTs are presented in FIG. 6. Two different views of SEM images were presented for both pristine SWNTs and functionalized SWNTs. The pristine SWNTs exist as bundles with 20 to 30 nm size in diameter, as shown in FIGS. 6(a) and 6(b). Before functionalization, the walls of the tube were clean and smooth. SWNTs tended to aggregate into bigger bundles after the reaction, with typical diameter of 200 to 300 nm. These are shown in the spectra of 6(c) and 6(d). Because of the attachment of amino acid and aldehyde, the wall the tube became rough as shown in FIG. 6(d). However, the cylindrical shape of SWNTs is clearly observable after functionalization. It is not possible to judge by the SEM if the functional groups were covalently attached to SWNTs. However, the solubility of the material in the organic solvent, and the FTIR, H-NMR, and UV-vis data are decisive arguments in support of the covalent functionalization of SWNTs.

Example 2

This exemplary embodiment shows a method of synthesis of highly, water and alcohol, soluble nanotubes, and in particular, SWNT. The experiment includes utilizing a CEM Model 205 microwave oven with a typically 100 ml or larger closed vessel reaction chamber, lined with Teflon PFA® and fitted with a 0~200 psi pressure controller. The SWNTs used were prepared by the high pressure HiPCO process.

In this embodiment, 10 to 20 mg of SWNTs were added to 20 ml of a mixture of 1:1 nitric acid (70%) and sulfuric acid (97%) in the reaction chamber. The reaction vessel was then subjected to microwave radiation. The microwave power was set at 50% of a total of 900 watts, and the pressure was set at 20 psi. The microwave-induced reaction was carried out for 1, 2, 3, 5, 10 and 20 minutes respectively. Three minutes was found to be the optimum reaction time. At this point, the functionalized SWNTs became highly water soluble, and no nanotubes were lost. After the reaction, the reacted mixture was diluted with de-ionized (DI) water. Then the mixture was filtered through a 10 µm PTFE membrane paper, and the filtrant was transferred to a dialysis bag (nominal MWCO 12,000-14,000). When the pH reached 7, the diluted mixture was removed and concentrated in a vacuum evaporator. The resulting black SWNT solids were used for testing solubility and for characterization. The spectra shown are from nanotubes that were reacted for 3 minutes.

Field emission SEM images were taken using a LEO microscope and the TEM using a 200 kV LEO microscope. The infrared and Raman spectra were recorded using a Perkin Elmer FTIR spectrometer and Horiba/Jovin Yvon Lab Ram system with 632.8 nm excitation, respectively. The thermogravimetric analysis measurements were performed with a Universal V3.7A instrument. The UV-vis-NIR spectra were obtained from Hewlett Packard, Model 8453 UV-Visible spectrophotometer. The particle size analysis was performed on a Beckman Coulter N4 Plus Submicron Particle Size Analyzer.

Laser light scattering particle size measurements of the aqueous solutions of microwave functionalized SWNTs were compared with measurements made on an aqueous suspension of pristine SWNTs. The suspension prepared by sonication of a mixture of 0.1 weight % and 0.5 weight % of the surfactant Triton-X showed particle sizes ranging from 100 nm to 600 nm with a peak at 300 nm at detection angles of 62.2 and 90 degrees. In contrast, the aqueous solution of microwave functionalized SWNTs did not show the existence of particles in the 3 to 800 nm size range, clearly indicating that these nanotubes dissolve in water.

Figure 8:
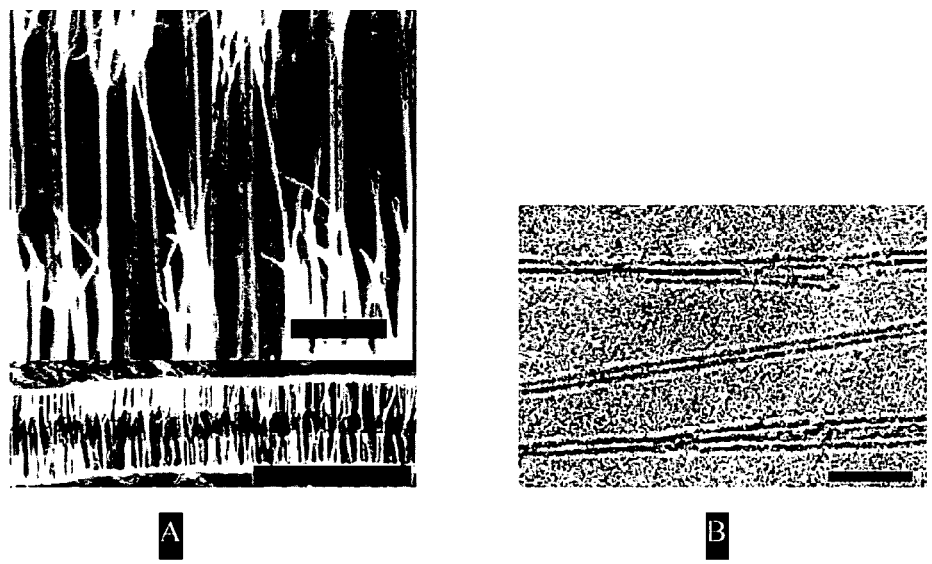
FIG. 8(a) depicts SEM images of functionalized SWNTs deposited from an aqueous solution wherein the bottom image depicts the SEM image at lower magnification showing alignment of the functionalized SWNTs (scale bar=2 μm) and the top image is a higher magnification image of the aligned SWNTs (scale bar=200 nm).
FIG. 8(b) depicts a TEM image of functionalized SWNTs deposited from an aqueous solution specifically showing debundled functionalized SWNTs (scale bar=10 nm).

SWNTs deposited from aqueous solution generate scanning electron microscope (SEM) and transmission electron microscope (TEM) images displayed in FIGS. 8A and 8B, respectively. The SEM images indicate clear alignment of the depositing nanotubes resulting from capillary forces during evaporation of the solvating water molecules. Alignment of the carbon nanotubes is seen each time after evaporation of a drop of the solution. The TEM image shows extensive debundling of the SWNT ropes, but no indication of structural modification of the sidewalls can be seen at this magnification level.

Figure 9:
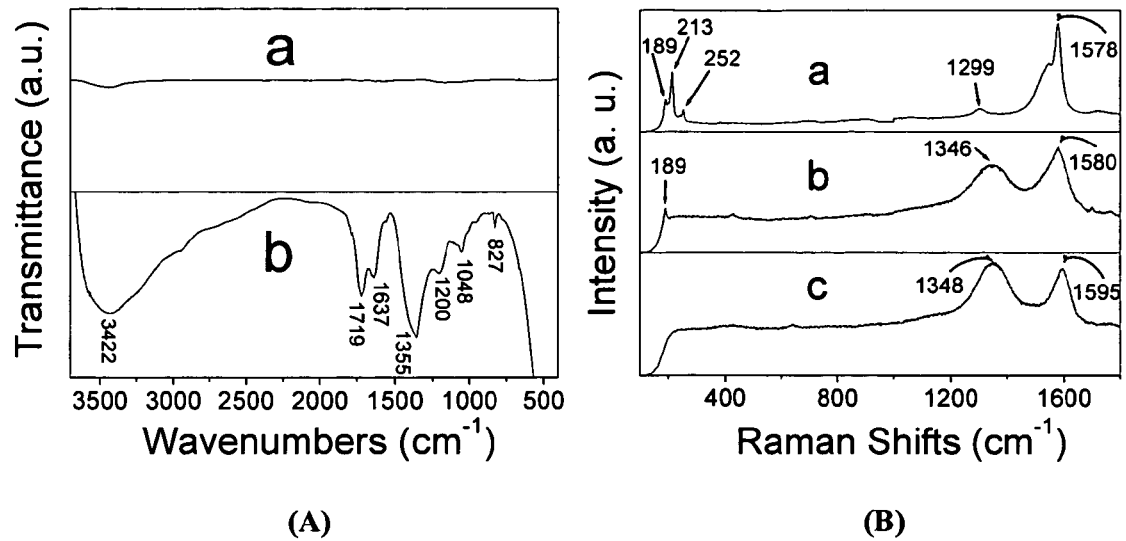
FIG. 9(a) depicts FTIR spectra (excited by 632.8 nm radiation) of the functionalized SWNTs, wherein (a) pristine SWNTs; and (b) microwave functionalized SWNTs.
FIG. 9(b) depicts Raman spectra (excited by 632.8 nm radiation) of the functionalized SWNTs wherein (a) pristine SWNTs; (b) functionalized SWNTs in solid phase, and (c) functionalized SWNTs in aqueous solution.

In order to characterize the chemical groups formed on the nanotube sidewalls and tube ends after microwave treatment, Fourier-Transform infrared (FTIR) and Raman spectra of the functionalized SWNTs were measured and are shown in FIG. 9 FTIR spectra of the microwave functionalized SWNTs were obtained to determine the structure of the chemical groups formed on the nanotube sidewalls and tube ends. Like graphite, the FTIR spectrum of the pristine nanotubes (FIG. 9Aa) is practically featureless with extremely low infrared absorption intensities. After the microwave-induced functionalization a typical FTIR spectrum (FIG. 9Ab) showed a number of infrared lines, which were assigned as follows: The line at 1719 $cm^{-1}$ was assigned to the C=O stretching mode of the —COOH groups (where the carbon is from the SWNT backbone) on the SWNTs, whereas the intense, broad line centered at 3422 $cm^{-1}$ was assigned to the —OH stretching mode of the —COOH group. The line at 1637 $cm^{-1}$ was assigned to the SWNT C=C graphitic stretching mode that is infrared-activated by extensive sidewall functionalization. The strong line observed at 1355 $cm^{-1}$ was assigned to the asymmetric $SO_2$ stretching mode of the acid sulfonate (—$SO_2$OH) group, whereas the lower frequency line at 1200 $cm^{-1}$ was assigned to the $SO_2$ symmetric stretching mode. The shoulder near 2600 $cm^{-1}$ was assigned to the —OH group of the sulfonic acid group. The FTIR spectrum is consistent with elemental analysis of the functionalized SWNTs, which showed that one in three carbon atom on the SWNT backbone was carboxylated, and one in ten was sulfonated. In addition, an FTIR spectrum taken in KBr (not shown here) showed a line of medium intensity at 592 $cm^{-1}$, which was assigned to the C—S stretching mode, thus implying that the acid sulfonate functionalization was covalent. In some samples, the presence of trace water formed the hydrated sulfonic acid group, —$SO_3$—H+$H_2O$, which gave rise to a strong infrared line at 1114 $cm^{-1}$ assigned to the asymmetric stretching mode of $SO_3$, and a shoulder near 1000 $cm^{-1}$ assigned to the corresponding symmetric stretching mode. The combination of extensive carboxylation and acid sulfonation on the SWNTs resulted in charge transfer-induced formation of an SWNT polyelectrolyte salt in the presence of polar solvent molecules followed by dissolution via ionic dissociation.

In the Raman spectrum of pristine SWNTs (FIG. 9Ba, right panel), SWNTs of three different diameters are indicated by the peaks at 189 $cm^{-1}$, 213 $cm^{-1}$ and 252 $cm^{-1}$ due to the SWNT radial breathing modes (RBMs). The strong tangential C—C mode is seen at 1578 $cm^{-1}$, and a weak line due to defects and disorder on the SWNT framework is observed at 1299 $cm^{-1}$. After three minutes of nitration, only the RBM line at 189 $cm^{-1}$ associated with larger diameter SWNTs, is observed (FIG. 3Bb, right), suggesting that the smaller diameter SWNT were the first to be functionalized. Compared to the Raman spectrum of pristine SWNTs there is a 2 $cm^{-1}$ up-shift of the tangential mode frequency of the reacted SWNTs probably due to the attachment of electronegative groups, such as —COOH and —$NO_2$ to the SWNT backbone. Furthermore, the broad line in the defect mode region of the spectrum broadens, shifts up in frequency and dramatically increases in intensity. This is due to the extensive nitration and carboxylation of the sidewalls and tube-ends resulting in $sp_3$-hybridization and disorder on the nanotube framework. Part of the broadening and up-shift can also be attributed to the appearance of the symmetric stretching mode of the —$NO_2$ groups in the Raman spectrum. FIG. 9Bc (right panel) shows the Raman spectrum of the functionalized SWNTs in aqueous solution—the first time such a spectrum has been obtained for SWNTs. Probably because of water solvation around the nanotube backbone, RBM modes are not observed and the tangential mode frequency is shifted up in value by 15 $cm^{-1}$ relative to that of the functionalized solid.

Figure 10:
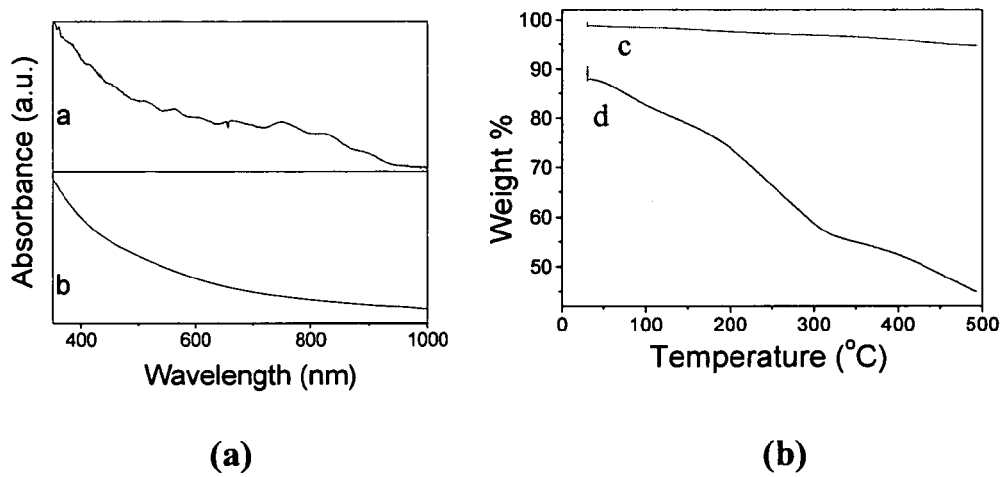
FIG. 10(a) depicts visible-near infrared (vis-NIR) spectra data under pure nitrogen at a heating rate of 10° C. per minute for pristine and microwave functionalized SWNTs, wherein (a) Pristine SWNTs suspended in dimethylformamide, and (b) Aqueous solution of microwave reacted nanotubes.
FIG. 10(b) depicts thermogravimetric analysis (TGA) data under pure nitrogen at a heating rate of 10° C. per minute for pristine and microwave functionalized SWNTs, wherein (c) pristine SWNT powder and (d) microwave functionalized SWNTs.

Further characterization of the functionalized SWNT aqueous solutions were performed using visible-near infrared (vis-NIR) absorption spectroscopic measurements of the solutions and comparing a typical spectrum to that taken from a suspension of pristine SWNTs in dimethylformamide (FIG. 10A). Inter-band transition absorptions associated with the van Hove singularities in quasi-one dimensional pristine SWNTs are clearly seen at 740, 820 and 890 nm in spectrum of the pristine SWNTs shown on the left panel of FIG. 4a. The corresponding spectrum of the microwave functionalized solution is featureless, indicating a loss of the quasi-one dimensional SWNT structure due to extensive functionalization of the sidewalls. The degree of nitration and carboxylation of the SWNT structure indicated by the infrared and Raman data was quantified by thermogravimetric analysis (TGA) measurements on pristine and microwave functionalized SWNTs performed under dry nitrogen at a heating rate of 10° C. per minute from 30° C. to 500° C. The TGA traces shown in FIG. 4B indicate that compared to pristine SWNTs, the functionalized SWNT lose about 50% of its weight due to dissociation of the —$NO_2$ and —COOH groups from the nanotube backbone and tube ends. This would indicate that approximately every four carbons on the SWNT structure is functionalized by the microwave process.

As seen by this embodiment, in addition to its high solubility, aqueous solutions of microwave functionalized SWNTs are electrically conducting, with conductivity in de-ionized water of 215.8 μS relative to that of 1.5 μS for de-ionized water. This raises the possibility for electrical manipulation (such as, electrodeposition) of the SWNTs from a solution phase.

Example 3

This exemplary embodiment shows a method of synthesis of ceramic-SWNT composite. The experiment includes utilizing a CEM Model 205 microwave oven with a typically 100 ml or larger reaction chamber, lined with Teflon PFA® and fitted with a 0~200 psi pressure controller. The Fourier transform infrared spectroscopy (FTIR) measurements were made either in highly purified KBr pellets (solid sample), or on NaCl crystal window (liquid sample) using a Perkin Elmer instrument. The Raman spectra were obtained using a Renishaw System 1000 Micro-Raman Spectrometer with 785 nm laser as the excitation source. The transmission electron microscope (TEM) images were recorded using a TOPCON 200 kV Ultra-High Resolution Transmission Electron Microscope. The scanning electron microscope (SEM) images and energy dispersive X-ray (EDX) data were obtained using a LEO 1530 instrument. Thin film X-ray diffraction (XRD)

data were collected on a Philips X'Pert MRD instrument equipped with an Eulerian Cradle, and with a Cu point source and Ni filter.

To reduce or eliminate residual metal catalyst and to generate —COOH groups, the SWNTs were first treated in nitric acid solution for few minutes under microwave radiation. In a typical composite forming reaction, about 10 mg of the pretreated SWNTs and 5 ml of chlorotrimethylsilane were added to the microwave reaction vessel. At the same time, another 5 ml of chlorotrimethylsilane was used as the control in a separate vessel. Both the vessels were subjected to microwave induced reaction for 10 minutes, with the power set at 75% of a total of 900 watts, and the pressure set at 125 psi. Once cooled, the liquid in the control vessel remained clear, but a tree-like solid composite was observed standing in the reaction solution. It was carefully removed from the reaction chamber, washed with chloroform, ethyl alcohol, and distilled water. After air drying over night, the composite weighed about 70 mg.

Under the reaction conditions presently disclosed, a gray-black solid with a branched structure, as shown in the optical image in FIG. 11a and FIG. 11b, rapidly precipitated out of the fine suspension. The composite was between 2 to 4 cm each in length, width and height. It was probably restricted by the size of the reaction vessel. The bulk structure was strong enough to be handled manually. The reaction was found to be highly reproducible; a solid composite of similar morphology, shape, color was obtained every time.

EDX analysis detected four elements in the composite: C, Si, O and Cl, with atomic compositions of 55%, 33%, 9%, and 3% respectively. This indicated a composite composition of 65% of SiC, 15% of SWNTs and 15% of $SiO_2$ by weight, assuming that all the oxygen was incorporated in $SiO_2$. The relatively small amount of chlorine might have been absorbed from the chlorotrimethylsilane that remained after washing and drying. An X-ray diffraction (XRD) scan of the composite was performed using an area detector and a rotating anode x-ray generator equipped with a graphite monochromator (Cu Ka; l=1.5418 Å). The composite was finely ground prior to running the XRD pattern. The presence of nanocrystalline SiC is clearly indicated by the XRD pattern displayed in FIG. 12, which shows broadened (111), (220) and (311) reflections of face-centered-cubic SiC at 2θ values of 35.6, 60.2 and 71.7 degrees, respectively. The presence of amorphous $SiO_2$ is indicated by a broad shoulder at a 2θ value near 22 degrees.

Figure 13:
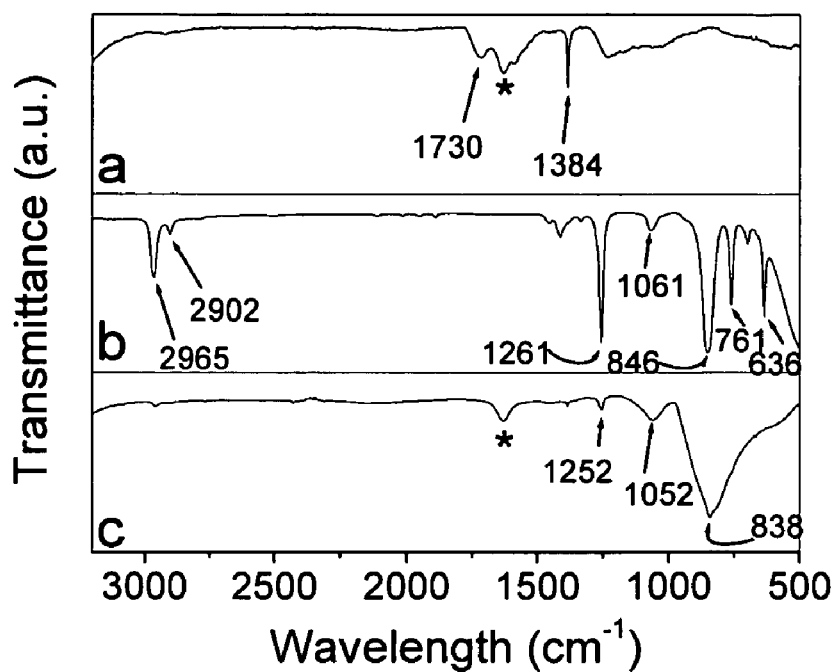
FIG. 13 shows FTIR spectra of the materials in the reaction process used to create the composite at various stages of the process.

The FTIR spectra of the starting material, the final composite and the chlorotrimethylsilane in the control vessel are shown in FIG. 13. Without the SWNTs, the chlorotrimethylsilane in the control vessel remained unchanged under microwave irradiation, and its spectrum was identical to that of the starting material, which is shown in FIG. 13b. The FTIR spectrum from the nitric acid purified SWNTs is shown in FIG. 13a. The carboxylic (—COOH) groups generated during the purification process gave rise to the line at 1730 $cm^{-1}$ due to the C=O stretching mode. However, the COOH groups were absent in the composite as shown by the spectrum in FIG. 13c. A strong, relatively broad Si—C stretching line was seen at 838 $cm^{-1}$. In addition, on comparing the spectrum of chlorotrimethylsilane (FIG. 13b) with that of the composite, it was observed that the C—H stretching mode lines at 2965 $cm^{-1}$ and 2902 $cm^{-1}$ and the different Si—C stretching and rocking modes at 846 $cm^{-1}$, 760 $cm^{-1}$ and 660 $cm^{-1}$, were absent in FIG. 3c. This indicates the complete cleavage of the SiC—$H_3$ bonds during the microwave reaction. The weak line at 1052 $cm^{-1}$ in FIG. 3c also suggests the formation of small amounts of $SiO_2$ in the composite. The presence of unreacted chlorotrimethylsilane in the control vessel indicated that the SWNTs were clearly involved in the formation of the SiC-SWNT composite. The absence of —COOH groups in the SiC-SWNT composite suggests that the reaction was initiated at these sites.

Figure 14:
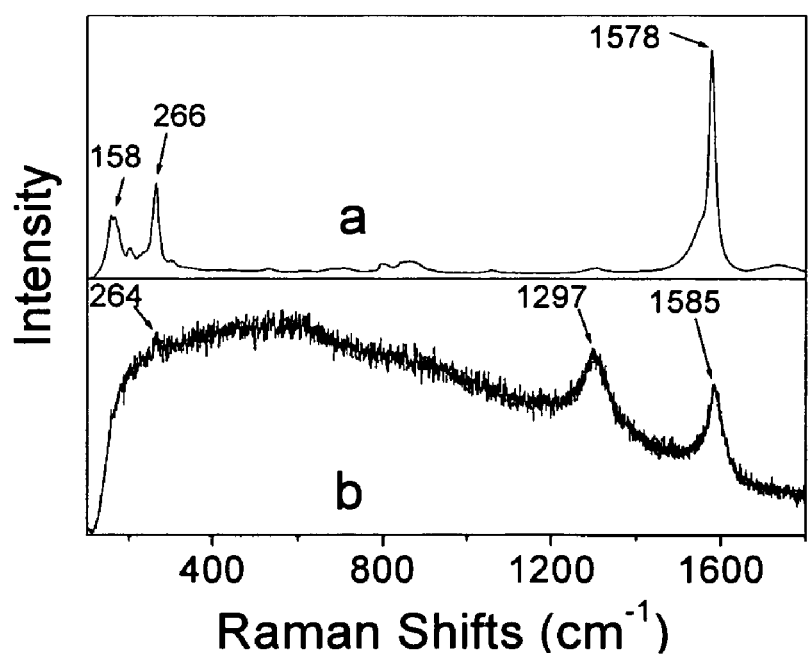
FIG. 14 depicts the Raman spectra of the SWNT composites in a pristine form and as-reacted with SiC.

Part of the composite was uniformly ground for obtaining the Raman spectrum shown in FIG. 14. The existence of SWNTs can be seen from both the appearance of the radial breathing mode and the tangential mode of the SWNTs in the Raman spectra. As compared to the pristine SWNTs, the Raman spectra of SiC-SWNT showed a strong increase in intensity of the defect or disorder mode, which most likely was due to the increased $sp_3$-hybridization induced disorder on the nanotube framework after functionalization. Some background fluorescence in the Raman spectrum of the composite was noted due to trace amount of absorbed chlorotrimethylsilane.

Figure 15:
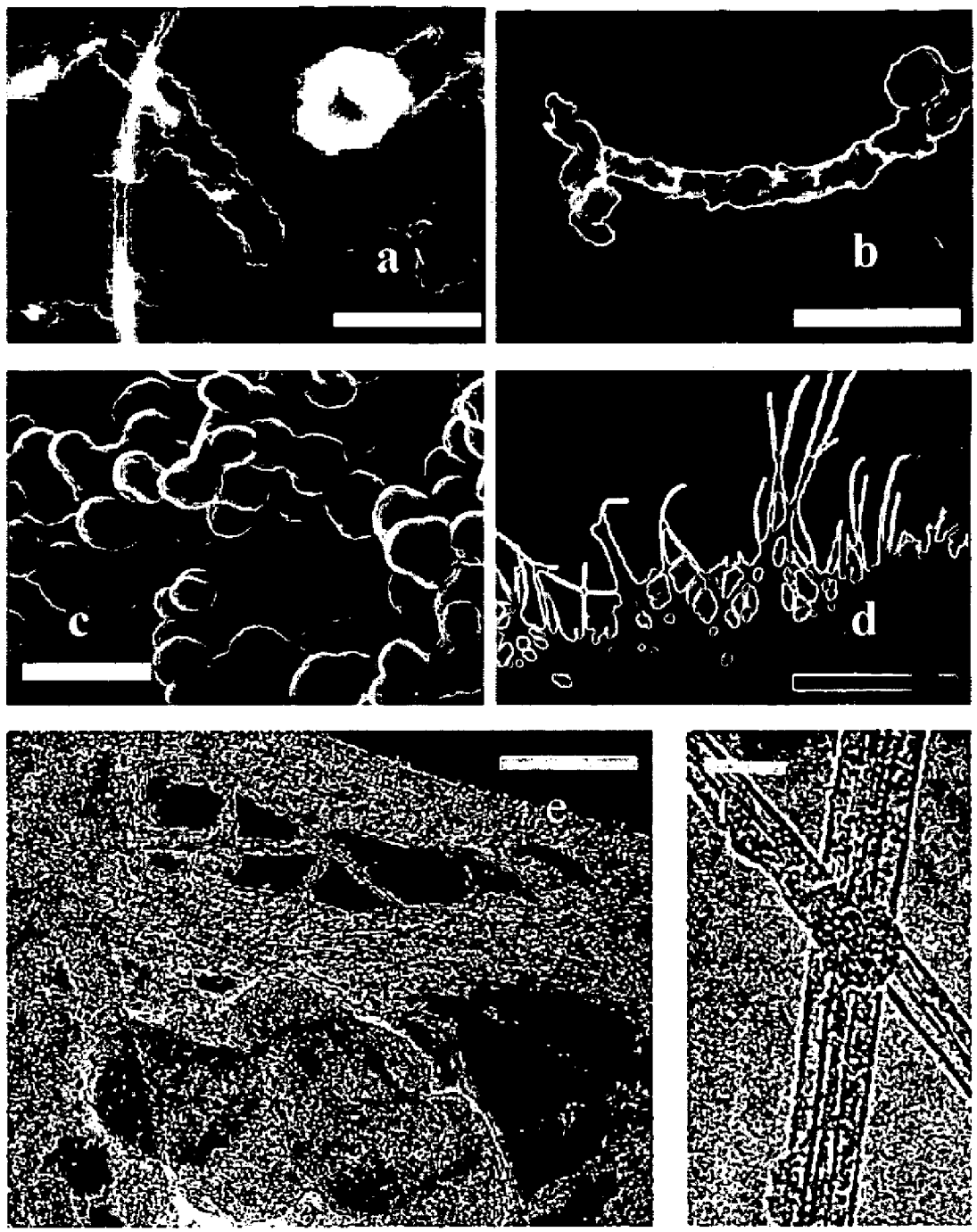
FIG. 15 depicts SEM and TEM images of the SWNTs-SiC composite.

The SEM images in FIG. 15 provide insights into how the three dimensional architecture of the composite was formed. As indicated by FIG. 15a and FIG. 15b, the nucleation of SiC probably occurred on the SWNT sidewalls at the onset of the reaction. Then, the SiC particles randomly cross-linked as evident from FIG. 15a and grew into the macroscopic architecture shown in FIG. 11. As shown in FIG. 15c, in certain areas of the composite, the SWNTs were completely covered by the SiC spheres. The image shown in FIG. 15d is from the surface of a fractured region, and the nanotubes that formed the underlying framework of the composite structure are still embedded. This indicates strong interfacial binding of the SWNTs to the SiC particles. The nanotubes therefore appear to reinforce the composite in a manner similar to steel in reinforced concrete. It is likely that the high tensile strength of the SWNTs prevented their breakage during fracture of the composite.

A small portion of the composite was ground and sonicated in methanol for about 5 minutes. Then a drop of the suspension was cast onto the TEM grid for measurements. The TEM image in FIG. 15e shows that the SWNTs were debundled and randomly linked by SiC spheres, which are clearly seen at the bottom of the image. A fine coating is observed on the SWNT sidewall in the magnified TEM image in FIG. 15f. In addition, the SWNTs appeared to be cross-linked. Relatively few SiC particles are seen in the TEM images because the grinding and sonication during the TEM sample preparation removed some of the loosely held particles.

Figure 16:
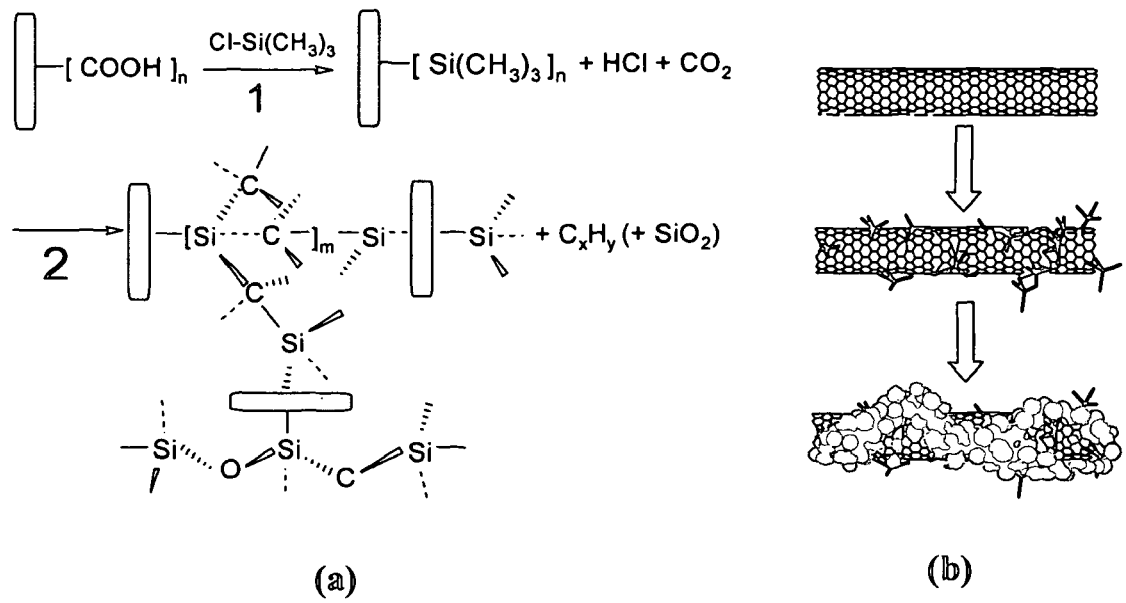
FIG. 16(a) depicts the mechanism for growth of the SiC-SWNT composite.
FIG. 16(b) is a pictorial illustration of the linkage between SiC and SWNTs.

A proposed mechanism for the growth of the SiC-SWNT composite is shown in FIG. 16a. The growth appeared to be initiated by the reaction of —$Si(CH_3)_3$ at the —COOH sites by forming HCl and $CO_2$. The methyl-silane thus formed was further decomposed by the microwave radiation to produce randomly growing SiC nanoparticles, which covered the nanotube surface and led to the formation of a heterogeneous SiC-SWNT network. The process depicted in FIG. 16b shows a layer of SiC chemically bonded to the SWNT surface, onto which larger SiC spheres grew. The oxygen in the reaction chamber reacted to form small amounts of $SiO_2$, which can be etched away by dilute HF.

The embodiment of the invention as synthesized through the synthesis method of the present invention is a high purity SiC-SWNT composite synthesized through a novel, low temperature, microwave-induced approach as verified by the illustrated infrared and Raman spectroscopy, x-ray diffraction, and electron microscopy data. The synthesis reaction, which was completed in a matter of minutes, involved the nucleation of SiC directly on the SWNT bundles. Formation of multiwalled nanotubes and other carbonaceous structures usually seen in the reverse approach of growing SWNTs in a ceramic matrix were not observed.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for rapidly generating a soluble, functionalized nanomaterial comprising:
   providing a substantially non-soluble nanomaterial and at least one functionalizing reactant; and
   subjecting the nanomaterial and the at least one functionalizing reactant to microwave conditions;
   wherein after the nanomaterial and the at least one functionalizing reactant are subjected to the microwave conditions, the nanomaterial is: (i) functionalized, and (ii) substantially soluble in a solvent.

2. The method of claim 1 wherein said nanomaterial is selected from the group consisting of single wall carbon nanotubes (SWNTs), multiwall carbon nanotubes, carbon nanohorns, fullerenes, nano onions and nanocomposites.

3. The method of claim 2 wherein said nanomaterial comprises an SWNT.

4. The method of claim 1 wherein prior to subjecting the nanomaterial to the microwave conditions, the nanomaterial is subjected to an acidic treatment.

5. The method of claim 4 wherein said acidic treatment comprises about a 1:1 mixture of nitric acid and sulfuric acid in water.

6. The method of claim 1 wherein the nanomaterial and the at least one functionalizing reactant are subjected to the microwave conditions from about 1 second to about 30 minutes.

7. The method of claim 1, wherein the nanomaterial is carboxylatically functionalized.

8. The method of claim 1, wherein the nanomaterial is sulphatically functionalized.

9. The method of claim 1, wherein the nanomaterial is nitratically functionalized.

10. The method of claim 1, wherein the nanomaterial is hydrophilically functionalized.

11. The method of claim 1, wherein the nanomaterial is polymerically functionalized.

12. The method of claim 1, wherein the nanomaterial is covalently functionalized.

13. The method of claim 1, wherein the solvent is water.

14. The method of claim 1, wherein the solubility of the functionalized nanomaterial is more than 10 mg of functionalized nanomaterial per milliliter of de-ionized water and ethanol under ambient conditions.

* * * * *